Figures 1, 2:
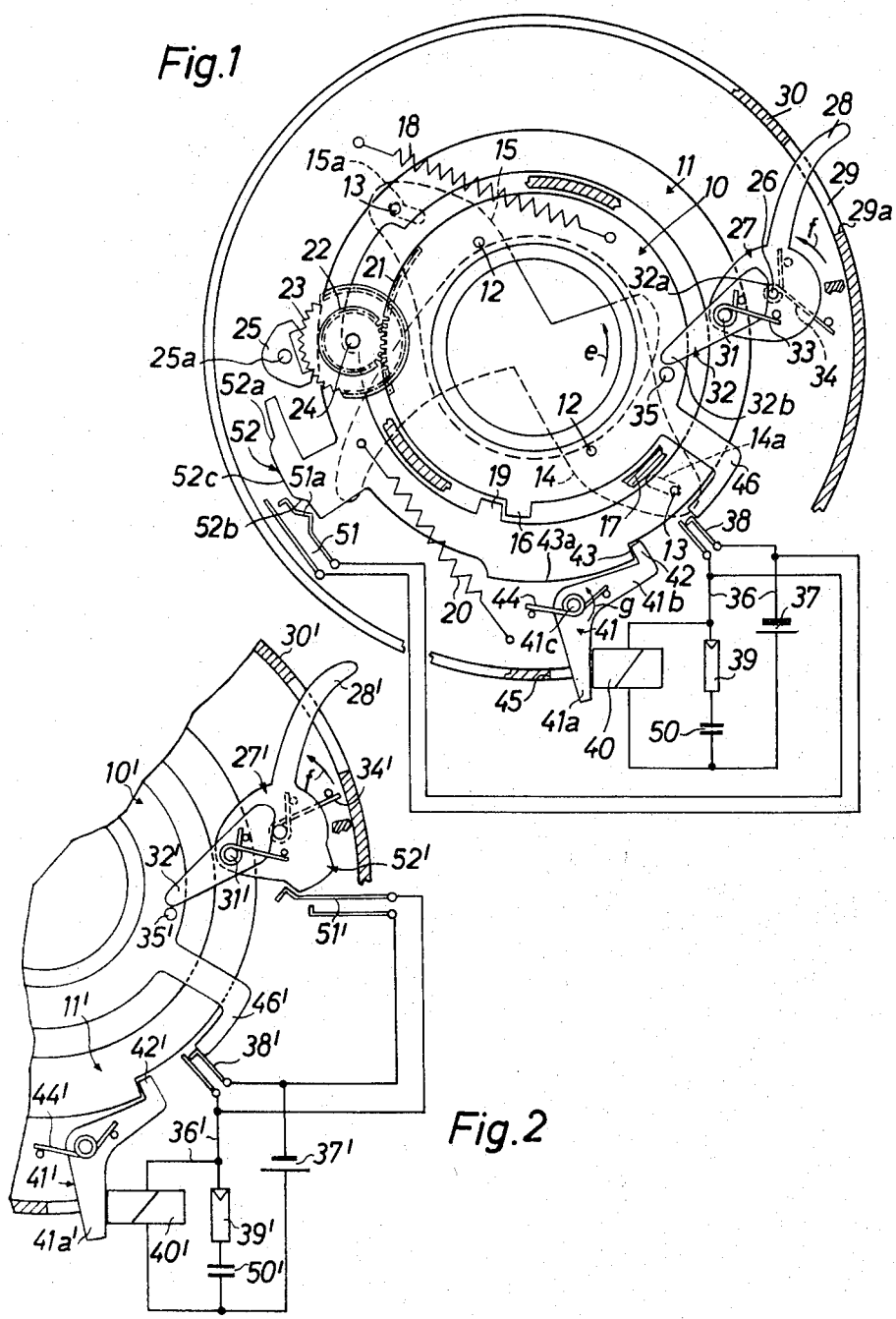

Dec. 5, 1967  G. KIPER  3,356,004

PHOTOGRAPHIC CAMERA

Filed July 7, 1965

INVENTOR.

GERD KIPER

BY

Michael J. Striker

3,356,004
PHOTOGRAPHIC CAMERA
Gerd Kiper, Unterhaching, near Munich, Germany, assignor to Agfa-Gevaert Aktiengesellschaft, Leverkusen, Germany
Filed July 7, 1965, Ser. No. 470,171
Claims priority, application, Germany, July 9, 1964, A 46,541
14 Claims. (Cl. 95—63)

The present invention relates to photographic cameras with everset shutters. More particularly, the invention relates to an improved delay circuit capable of selecting the exact size of the diaphragm opening and/or the exact exposure time in dependency on resistance which is offered by a variable resistor and which is preferably a function of the intensity of light coming from a viewed scene or subject.

It is an important object of the present invention to provide a very simple electrical delay circuit which occupies little room in a photographic camera and which insures that the exact exposure time and/or the exact size of the diaphragm opening is an accurate function of the intensity of light and that such exposure time and the size of the diaphragm opening may be selected in a fully automatic way.

Another object of the invention is to provide a delay circuit which permits short exposure times.

A further object of the invention is to prevent inadvertent variations of the shutter speed caused by the time required for charging the capacitor or by the inertia of a relay armature.

Still another object of my invention is to provide an automatic still camera which employs a single set of blades both to select the exposure time and to select the size of the diaphragm opening and wherein such exposure values may be controlled by an electrical delay circuit of the above outlined characteristics.

A concomitant object of the invention is to provide a novel system of trips or cams which control the opening and closing of switches in the delay circuit in a predetermined sequence and to mount the trips or cams in such a way that their operation is incidental to cocking and release of the shutter mechanism.

Briefly stated, one feature of my invention resides in the provision of an everset and shutter mechanism for photographic cameras. The mechanism comprises a pair of rings or analogous setting members which are movable with and relative to each other between starting and cocked positions, resilient means for biasing the setting members to starting positions, cocking means for moving the setting members to cocked positions, blades movably coupled to the setting members and defining an opening when one of the setting members moves to starting position ahead of the other setting member, and an electric circuit for delaying movement of the other setting member to starting position. This circuit comprises an assembly composed of a variable resistor (preferably a photoelectric resistor mounted in or on the front wall of the camera housing so that its resistance is a function of the intensity of light coming from a viewed scene or subject) and a capacitor connected in series with the resistor, a normally deenergized relay connected in parallel with the assembly and having an armature which is movable into blocking engagement with the other setting member when the relay is energized to prevent movement of the other setting member from cocked position, a source of electrical energy connected in series with the assembly, normally open first and second switches connected in series with the source and with the assembly and in parallel with each other so that the relay is energized in response to closing of at least one switch, means (preferably comprising a trip which is rigid with the one setting member) for closing the first switch in cocked position of the one setting member, and means (preferably including a cam rigid with the other setting member or with the cocking means) for temporarily closing the second switch during cocking of the setting members so that the capacitor may be fully charged during such cocking and discharges across the resistor on opening of the first switch (i.e., when the second switch is already open) to energize the relay for an interval whose length is determined by the resistance of the resistor. If the resistance of the resistor is a function of the intensity of incoming light, the exact length of the delay with which the other setting member returns to starting position is also a function of such intensity. It will be seen that the improved circuit insures that the capacitor is properly charged before the first switch opens and that the relay is invariably energized prior to opening of the first switch.

The novel features which are considered as characteristic of the invention are set forth in particular in the appended claims. The improved photographic camera itself, however, both as to its construction and its mode of operation, together with additional features and advantages thereof, will be best understood upon perusal of the following detailed description of certain specific embodiments with reference to the accompanying drawings, in which.

FIG. 1 is a diagrammatic front elevational view of a portion of a combined diaphragm and shutter mechanism which embodies the delay circuit of my invention; and FIG. 2 is a fragmentary diagrammatic front elevational view of a combined diaphragm and shutter mechanism which embodies a modified delay circuit.

Referring first to FIG. 1, there is shown a portion of a still camera which employs a single set of blades or vanes 14, 15 both as a shutter and a diaphragm. These blades form part of a combined diaphragm and shutter mechanism which is accommodated mainly in a housing 30 and further includes two movable setting members 10, 11 here shown as concentric rings rotatable about the optical axis. The ring 10 carries pins 12 each of which serves as a pivot for one of the blades 14, 15, and the ring 11 carries pins 13 which extend into elongated cam slots 14a, 15a of the respective blades so that the position of each blade changes when one of the rings is rotated with reference to the other ring or when both rings rotate at different speeds. It is clear that the mechanism shown in FIG. 1 may comprise more than two blades.

The ring 10 is provided with a radially outwardly extending motion transmitting projection or lug 16 which may be moved into abutment with or away from a fixed stop 17 of the housing 30. This stop 17 determines the starting position of the ring 10, namely, that end position when the mechanism is uncocked. A helical return spring 18 is connected with the ring 10 and with the housing 30, and its purpose is to bias the ring 10 in a counterclockwise direction (see the arrow e) so that, in the absence of an oppositely directed force, the projection 16 will normally remain in abutment with the stop 17.

The ring 11 is provided with a radially inwardly extending projection or lug 19 which extends into the path of the projection 16 and is entrained thereby when the ring 10 is caused to rotate in a clockwise direction, i.e., when the projection 16 moves away from the stop 17. The ring 11 is biased by a second helical return spring 20 one end of which is secured to the housing 30 and which tends to rotate the ring 11 in a counterclockwise direction (arrow e). The arrangement is such that the spring 20 maintains the projection 19 in abutment with the projection 16 while the ring 10 is cocked against the bias of the return spring 18, but the ring 10 is free to move back to its starting position (in which the projection 16 abuts against the stop 17) independently of the ring 11. In FIG. 1, the rings 10, 11 are almost fully cocked, i.e., the projection 16 is located at close to a maximum distance from the stop 17. During cocking, the blades 14, 15 do not allow the light to reach the film. However, when the ring 10 returns to starting position ahead of the ring 11, the blades define a diaphragm opening which is closed as soon as the ring 11 catches up with the ring 10, namely, as soon as the projection 19 returns into abutment with the projection 16.

The ring 10 is provided with an arcuate toothed portion or rack 21 which forms part of a retard mechanism. This retard mechanism further comprises a pinion 22 which meshes with the rack 21 and is connected to a shaft 24 for an escapement wheel 23 which cooperates with the tangs of an escapement lever 25 mounted on a shaft 25a. The length of the rack 21 is such that the retard mechanism controls the speed of the ring 10 all the way from the moment when the ring 10 can follow the bias of the return spring 18 to the moment when the projection 16 reaches the stop 17.

The cocking means of the combined diaphragm and shutter mechanism comprises a cocking lever 27 which is rockable about the axis of a fixed shaft 26 and includes an outwardly extending actuating arm 28. This arm extends through a cutout 29 in the housing 30 so that its free end may be engaged by hand in order to be moved in a counterclockwise direction as indicated by an arrow f. The cocking lever 27 carries a pin 31 for a turnable pawl 32 which is biased by a torsion spring 33 tending to maintain its face 32a in abutment with the shaft 26. The pallet 32b of the pawl 32 extends toward the optical axis and may engage a motion transmitting pin 35 on the ring 10. The length of the pawl 32 is selected in such a way that its pallet 32b will bypass the pin 35 when the projection 16 moves a predetermined distance away from the stop 17, whereupon the ring 10 is free to follow the bias of the spring 18 and to return its projection 16 into actual abutment with the stop 17. The cocking lever 27 is biased by a second torsion spring 34 which tends to rotate it in a clockwise direction so that the arm 28 normally abuts against a surface 29a bounding a portion of the cutout 29.

The electric time-lag or delay circuit 36 of the camera serves to release the ring 11 a predetermined interval of time following disengagement of the pin 35 from the pallet 32b of the pawl 32. This delay circuit includes a source 37 of electrical energy, preferably a battery or a miniature accumulator, which is connected in series with a normally open first switch 38, hereinafter called control switch. The control switch 38 is connected in series with an assembly including a photoelectric resistor 39 and a capacitor 50, connected in series with the resistor. I prefer to install the source 37 in the interior of the camera housing, and the resistor 39 is preferably mounted in or on the front wall of the camera housing so that it may be exposed to light which comes from a subject or scene. The assembly including the variable resistor 39 and the capacitor 50 is connected in parallel with a relay 40 which is normally deenergized and comprises a movable armature here shown as a blocking lever 41 which is rockable about the axis of a fixed shaft 41c. When the relay 40 is energized, it attracts the lower arm 41a of the blocking lever 41 whereby a locking nose 42 on the upper arm 41b of the blocking lever engages a radially outwardly extending shoulder 43 of the ring 11 to hold this ring in cocked position against the action of the return spring 20. The blocking lever 41 is biased by a torsion spring 44 which is convoluted around the shaft 41c and tends to rotate the lever 41 in a clockwise direction, i.e., counter to the direction indicated by an arrow g. The arm 41a then abuts against a fixed stop 45.

The means for automatically closing the normally open control switch 38 comprises an L-shaped cam or trip 46 which is rigid with the ring 10 and whose tip will move the movable contact of the switch 38 toward and into engagement with the fixed contact when the cocking lever 27 is rotated in a sense to move the ring 10 to cocked position, i.e., against the bias of the return spring 18. Such closing of the control switch 38 will take place shortly before the rings 10, 11 are fully cocked, that is, shortly before the tip of the pallet 32b on the pawl 32 moves past the pin 35. In other words, the control switch 38 is invariably closed when the ring 10 is fully cocked.

In accordance with an important feature of my invention, the delay circuit 36 further comprises a second switch 51, hereinafter called charging or loading switch, which is connected in parallel with the control switch 38 and is normally open. The charging switch 51 may be closed by a cam or trip 52 which, in the embodiment of FIG. 1, is rigid or integral with the ring 11. The cam 52 comprises two mutually inclined outer cam faces 52a, 52b and a centrally located cam face or platform 52c. When the ring 11 is rotated by the projection 16 and turns in a clockwise direction, the cam face 52a will be the first to engage the movable contact of the charging switch 51 and will cause the switch to close. The switch 51 remains closed while its movable contact is engaged by the platform 52c, but the movable contact will move away from the fixed contact to open the charging switch 51 when its tooth 51a is engaged by the cam face 52b. Thus, the charging switch 51 is closed when the tooth 51a is engaged by the cam face 52a and platform 52c. FIG. 1 shows that the times when the switches 38, 51 are closed overlap, i.e., that the control switch 38 is closed by the trip 46 of the ring 10 before the cam 52 of the ring 11 allows the charging switch 51 to open. The cam face 52a engages the movable contact of the switch 51 immediately or shortly after the projection 16 of the ring 10 begins to move away from the stop 17 and the cam face 52b allows the switch 51 to open shortly or immediately after the control switch 38 is closed but always before the switch 38 opens.

In order to make an exposure, the user engages the arm 28 and turns the cocking lever 27 in the direction indicated by the arrow f. The pawl 32 follows such movement because its face 32a abuts against the shaft 26 whereby the pallet 32b entrains the pin 35 and turns the ring 10 in a clockwise direction. The projection 16 of the ring 10 entrains the projection 19 of the ring 11 so that the two rings rotate as a unit and the return springs 18, 20 store energy at the same rate at which the projection 16 moves away from the stop 17.

Shortly or immediately after the ring 10 begins to move its projection 16 away from the stop 17, the inclined cam face 52a of the cam 52 on the ring 11 engages the tooth 51a and closes the charging switch 51. This completes the delay circuit 36 even though the control switch 38 remains open, the switches 38, 51 being connected in parallel, whereby the capacitor 50 is charged through the photoelectric resistor 39. The relay 40 is energized shortly after closing of the charging switch 51 so that it attracts the arm 41a of the blocking lever 41 with the result that the locking nose 42 bears against the ring 11 and engages the shoulder 43 as soon as the ring 11 reaches the angular position shown in FIG. 1. The trip 46 engages the movable contact of and closes the control switch 38 shortly before the shutter mechanism is fully cocked so that the delay circuit 36 is completed both ways, namely, through the control switch 38 and through the charging switch 51. However, the latter opens shortly thereafter, i.e., as soon as the tooth 51a slides along the cam face 52b. In other words, the charging switch 51 closes before the control switch 38 but the latter closes before the charging switch 51 opens so that the delay circuit remains completed from the moment when the tooth 51a is engaged by the cam face 52a and to the moment when the trip 46 moves away from the movable contact of the control switch 38.

As the user continues to turn the arm 28 in the direction indicated by the arrow f, the tip of the pallet 32b moves past the pin 35 so that the ring 10 is free to follow the bias of the return spring 18 but the ring 11 cannot follow such movement, even though it is under the bias of the return spring 20, because its shoulder 43 is engaged by the nose 42 of the blocking lever 41. This lever is biased by the torsion spring 44 but cannot follow such bias because the force which attracts the arm 41a in response to energization of the relay 40 is stronger. Of course, the speed at which the ring 10 returns its projection 16 toward the fixed stop 17 is controlled by the retard mechanism 21–25a which insures that the return movement of the ring 10 is gradual.

The trip 46 releases the movable contact of the control switch 38 shortly after the ring 10 begins to turn in the direction indicated by the arrow e. This opens the delay circuit 36; however, the discharge of the capacitor 50 across the photoelectric resistor 39 delays the deenergization of the relay 40, and the duration of such delay is a function of the intensity of light which impinges against the resistor 39, i.e., the resistor will cause a longer delay if the intensity of light is low but its resistance decreases in response to stronger intensity of light which comes from the viewed scene or subject.

When the relay 40 is deenergized, the torsion spring 44 immediately turns the blocking lever 41 in a clockwise direction (i.e., counter to that indicated by the arrow g), whereby the nose 42 moves away from the shoulder 43 and the ring 11 turns under the bias of the spring 20 in the direction indicated by the arrow e to move its projection 19 into renewed engagement with the projection 16 of the ring 10. This closes the diaphragm opening. The fact that the relay 40 is energized again when the ring 11 follows the bias of the return spring 20 (because the cam faces 52c and 52a will engage the tooth 51a of the charging switch 51) is of no consequence since the nose 42 then simply bears against an arcuate face 43a of the ring 11 and cannot prevent rotation of this ring back to the starting position.

The exact size of the diaphragm opening and also the exposure time will be determined by the photoelectric resistor 39 because this resistor determines the exact moment when the nose 42 of the blocking lever 41 releases the ring 11. Thus, if the ring 11 is released shortly after the ring 10 begins to turn in response to the bias of the spring 18 and at the speed controlled by the retard mechanism 21–25a, the diaphragm opening will be relatively small and the exposure time will be short because the resistance of the resistor 39 is low. If the resistance of the resistor 39 is higher, because the intensity of light is low, the nose 42 will release the ring 11 at a later stage of movement of the ring 10 toward its starting position.

As soon as the operator releases the arm 28, the spring 34 compels the cocking lever 27 to turn in a clockwise direction and the lever moves its arm 28 back into abutment with the surface 29a. During such turning of the lever 27, the pallet 32b of the pawl 32 strikes against the pin 35 and the pawl is caused to rotate about the pin 31 by turning in a clockwise direction so that the pallet bypasses the pin 35 and is again ready to cock the ring 10 in response to renewed turning of the arm 28 in a counterclockwise direction.

FIG. 2 illustrates a portion of a modified mechanism wherein the parts are identified by numerals corresponding to those shown in FIG. 1 but each followed by a prime. The sole difference between the two mechanisms is that the structure of FIG. 2 comprises a delay circuit 36' whose charging switch 51' is closed by a cam or trip 52' provided on the cocking lever 27', i.e., the cam 52' is transposed from the ring 11' onto the lever 27'. The function of the delay circuit 36' is analogous to that of the circuit 36. When the user begins to turn the cocking lever 27' in a counterclockwise direction (arrow f), the cam 52' closes the charging switch 51' so that the relay 40' is energized and the capacitor 50' is charged. The cam 52' will allow the charging switch 51' to open shortly after the trip 46' of the ring 10' closes the control switch 38'. The pallet of the pawl 32' moves past the pin 35' shortly after the control switch 38' closes so that the ring 10' begins to rotate in a counterclockwise direction and the trip 46' allows the control switch 38' to open. The nose 42' of the blocking lever 41' releases the ring 11' with a delay which is a function of the intensity of light that impinges against the photoelectric resistor 39' because the resistance of this resistor to the flow of current during discharge of the capacitor 50' will determine the exact moment when the relay 40' is deenergized, i.e., when the blocking lever 41' can follow the bias of its torsion spring 44' to release the ring 11'.

A very important advantage of my improved delay circuit is that the capacitor 50 has ample time to be fully charged not later than at the moment when the control switch 38 or 38' opens. It is already known to place a photoelectric resistor in series with a capacitor whose function is to delay the exact moment when the trailing setting member is free to follow the leading setting member. Such capacitors are used with a view to take inso consideration the characteristics of commercially available photoelectric resistors and to enlarge the operating range of such resistors. However, in all such heretofore known delay circuits, the capacitor is being charged only after the control switch closes because the delay circuit does not have a charging switch which would allow the capacitor to be fully charged in good time prior to release of the trailing setting member. In other words, the delay circuit will release the corresponding setting member with an undesirable delay, namely, with a delay which is determined by the resistance of the photoelectric resistor and with an additional delay which is necessary to allow for satisfactory charging of the capacitor. Since the leading setting member allows the control switch to open as soon as it begins to move back to starting position, the capacitor might not be fully charged at the time the control switch opens, particularly if the cocking lever is operated very rapidly. Thus, such conventional delay circuits are not fully reliable because the size of the diaphragm opening and/or the exposure time is not an accurate function of the intensity of light which reaches the photoelectric resistor.

Another serious drawback of conventional delay circuits which do not have a charging switch is that they are not reliable when the mass of the blocking element is relatively large, i.e., when the inertia of an element corresponding to the blocking lever 41 or 41' is such that the relay is unable to effect rapid release of the trailing setting member. This happens frequently when the intensity of light which reaches the photoelectric resistor is so low that the resistor offers relatively high resistance to the flow of electric current.

By the simple expedient of including in the delay circuit a charging switch 51 or 51' which is connected in parallel with the control switch 38 or 38', I insure that the capacitor is invariably and fully charged at the time the control switch opens. As shown in FIGS. 1 and 2, it is immaterial whether the charging switch 51 or 51' is closed by the trailing setting member 11 or 11' or by another part of the mechanism (in FIG. 2 by the cocking lever 27') which turns or otherwise moves at the time the setting members are cocked and which is capable of allowing the charging switch to open not later than at the time when the leading setting member 10 or 10' opens the control switch 38 or 38'. In other words, all that counts is to control the opening and closing of the charging switch 51 or 51' by a member which moves in response to cocking of the shutter mechanism.

The ring 10 or 10' can be called an opening member and the ring 11 or 11' can be called a closing member because these rings respectively expose and close the diaphragm opening.

It is clear that my present invention may be embodied in cameras whose shutter mechanism is not fully automatic. Thus, the delay circuit with switches 38, 51 or 38', 51' is equally useful in cameras wherein only the exposure time is selected in a fully automatic way and wherein such exposure time is determined by two setting members one of which moves ahead of the other and which, not unlike the rings 10, 11 or 10', 11', are rotatable about a common axis. Also, the delay circuit may be set by hand, particularly when the camera is set for flash operation. The retard mechanism will control return movement of the ring 10 or 10' in such a way that, in the case of flash operation or manual operation, the trailing ring 11 or 11' may be released while the retard mechanism is still running, i.e., while the ring 10 or 10' travels toward its starting position.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a camera, a self-cocking shutter mechanism comprising a pair of setting members movable with and relative to each other between starting and cocked positions; means for biasing said members to starting positions; means for cocking said members; blades movably coupled with said members and defining an opening when one of said members moves to starting position ahead of the other member; and an electric circuit for delaying movement of said other member to starting position, including an assembly composed of a variable resistor and a capacitor connected in series with said resistor, a relay connected in parallel with said assembly and having a movable armature arranged to block said other member in cocked position in response to energization of said relay, normally open first and second switches connected in series with said assembly and in parallel with each other so that said relay is energized and said capacitor is charged when at least one of said switches is closed, means for closing said first switch in cocked position of said one member, and means for temporarily closing said second switch during cocking of said members so that said capacitor is charged during such cocking and discharges across said resistor on opening of said first switch to energize said relay for an interval whose length is determined by the resistance of said resistor.

2. In a camera, a self-cocking shutter mechanism comprising a pair of setting members movable with and relative to each other between starting and cocked positions; means for biasing said members to starting positions; cocking and releasing means for moving said members to cocked positions and for releasing said members; blades movably coupled with said members and defining an opening when one of said members moves to starting position ahead of the other member; and an electric circuit for delaying movement of said other member to starting position, including an assembly composed of a variable resistor and a capacitor connected in series with said resistor, a source of electrical energy connected in series with said assembly, a relay connected in parallel with said assembly and having a movable armature arranged to block said other member in cocked position in response to energization of said relay, normally open first and second switches connected in series with said source and said assembly and in parallel with each other so that said relay is energized and said capacitor is charged when at least one of said switches is closed, means for closing said first switch in cocked position of said one member, and means provided on said cocking means for temporarily closing said second switch during cocking of said members so that said capacitor is charged during such cocking and discharges across said resistor on opening of said first switch to energize said relay for an interval whose length is determined by the resistance of said resistor.

3. In a camera, a self-cocking shutter mechanism comprising a pair of setting members movable with and relative to each other between starting and cocked positions; means for biasing said members to starting positions; means for cocking and releasing said members; blades movably coupled with said members and defining an opening when one of said members moves to starting position ahead of the other member; and an electric circuit for delaying movement of said other member to starting position, including an assembly composed of a variable resistor and a capacitor connected in series with said resistor, a source of electrical energy connected in series with said assembly, a relay connected in parallel with said assembly and having a movable armature arranged to block said other member in cocked position in response to energization of said relay, normally open first and second switches connected in series with said source and said assembly and in parallel with each other so that said relay is energized and said capacitor is charged when at least one of said switches is closed, means for closing said first switch in cocked position of said one member, and means provided on said other member for temporarily closing said second switch during cocking of said members so that said capacitor is charged during such cocking and discharges across said resistor on opening of said first switch to energize said relay for an interval whose length is determined by the resistance of said resistor.

4. In a camera, a self-cocking shutter mechanism comprising a pair of setting members movable with and relative to each other between starting and cocked positions; means for biasing said members to starting positions; means for cocking and releasing said members; blades movably coupled with said members and defining an opening when one of said members moves to sarting position ahead of the other member; and an electric circuit for delaying movement of said other member to starting position, including an assembly composed of a variable resistor and a capacitor connected in series with said resistor, a relay connected in parallel with said assembly and having a movable armature arranged to block said other member in cocked position in response to energization of said relay, normally open first and second switches connected in series with said assembly and in parallel with each other so that said relay is energized and said capacitor is charged when at least one of said switches is closed, means for closing said first switch in cocked position of said one member and means including a cam for closing said second switch on movement of said other member from starting position and for allowing said second switch to open on closing of said first switch so that said capacitor is charged during cocking of said other member and discharges across said resistor on opening of said first switch to energize said relay for an interval whose length is determined by the resistance of said resistor.

5. In a camera, a self-cocking shutter mechanism comprising a pair of setting members movable with and relative to each other between starting and cocked positions; means for biasing said members to starting positions; means for cocking and releasing said members; blades movably coupled with said members and defining an opening when one of said members moves to starting position ahead of the other member; and an electric circuit for delaying movement of said other member to starting position, including an assembly composed of a photoelectric resistor and a capacitor connected in series with said resistor, a source of electrical energy connected in series with said assembly, a relay connected in parallel with said assembly and having a movable armature arranged to to block said other member in cocked position in response to energization of said relay, normally open first and second switches connected in series with said assembly and with said source and in parallel with each other so that said relay is energized and said capacitor is charged when at least one of said switches is closed, means for closing said first switch in cocked position of said one member, and means for temporarily closing said second switch during cocking of said members so that said capacitor is charged during such cocking and discharges across said resistor on opening of said first switch to energize said relay for an interval whose length is determined by the resistance of said resistor.

6. In a camera, a self-cocking shutter mechanism comprising a pair of setting members movable with and relative to each other between starting and cocked positions; means for biasing said members to starting positions; means for cocking and releasing said members; blades movably coupled with said members and defining an opening when one of said members moves to starting position ahead of the other member; and an electric circuit for delaying movement of said other member to starting position, including an assembly composed of a photoelectric resistor exposed to the light coming from a viewed scene and a capacitor connected in series with said resistor, a source of electrical energy connected in series with said assembly, a relay connected in parallel with said assembly and having a movable armature arranged to block said other member in cocked position in response to energization of said relay, normally open first and second switches connected in series with said source and said assembly and in parallel with each other, each of said switches having a fixed contact and a movable contact, said relay being energized and said capacitor being charged when at least one of said switches is closed, means for engaging the moving contact of and for thereby closing said first switch in cocked position of said one member, and means including a cam having cam face means arranged to engage the movable contact of and to close said second switch during cocking of said members so that said capacitor is charged during such cocking and discharges across said resistor on opening of said first switch and subsequent to opening of said second switch to energize said relay for an interval whose length is determined by the resistance of said photoelectric resistor, such resistance being a function of the intensity of light coming from the viewed scene.

7. In a camera, a combined diaphragm and shutter mechanism comprising a pair of setting members movable with and relative to each other between starting and cocked positions; resilient means for biasing said members to starting positions; retard means for controlling the speed of movement of one of said members to starting position; means for cocking and releasing said members; blades movably coupled with said members and defining and opening when said one member moves to starting position ahead of the other member; and an electric circuit for delaying movement of said other member to starting position, including an assembly composed of a variable resistor and a capacitor connected in series with said resistor, a relay connected in parallel with said assembly and having a movable armature arranged to block said other member in cocked position in response to energization of said relay, normally open first and second switches connected in series with said assembly and in parallel with each other so that said relay is energized and said capacitor is charged when at least one of said switches is closed, means for closing said first switch in cocked position of said one member, and means for temporarily closing said second switch during cocking of said members so that said capacitor is charged during such cocking and discharges across said resistor on opening of said first switch to energize said relay for an interval whose length is determined by the resistance of said resistor.

8. A structure as set forth in claim 7, wherein said retard means is arranged to control the speed of movement of said one member all the way from the cocked and back to the starting position thereof.

9. In a camera, a combined diaphragm and shutter mechanism comprising a pair of concentric rings rotatable with and relative to each other about the optical axis between starting and cocked positions; return spring means for biasing said rings to starting positions; manually actuated cocking and releasing means for rotating said rings to cocked positions and for releasing said rings; blades movably coupled with said rings and defining a diaphragm opening when one of said rings rotates to starting position ahead of the other ring; retard means for controlling the speed of movement of one of said rings to starting position and an electric circuit for delaying rotation of said other ring to starting position, including an assembly composed of a photoelectric resistor and a capacitor connected in series with said resistor, a source of electrical energy connected in series with said assembly, a relay connected in parallel with said assembly and having a movable armature arranged to block said other ring in cocked position in response to energization of said relay, normally open first and second switches connected in series with said source and said assembly and in parallel with each other so that said relay is energized and said capacitor is charged when at least one of said switches is closed, means rotatable with said one ring for closing said first switch in cocked position of said one ring, and means for temporarily closing said second switch during cocking of said rings so that said capacitor is charged during such cocking and discharges across said photoelectric resistor on opening of said first switch to energize said relay for an interval whose length is determined by the momentary resistance of said photoelectric resistor.

10. In a camera, a combined diaphragm and shutter mechanism comprising a pair of concentric rings rotatable with and relative to each other about the optical axis between starting and cocked positions; return spring means for biasing said rings to starting positions; manually actuated cocking and releasing means for rotating said rings to cocked positions and for releasing said rings; blades movably coupled with said rings and defining a diaphragm opening when one of said rings rotates to starting position ahead of the other ring; retard means for controlling the speed of movement of one of said rings to starting position and an electric circuit for delaying rotation of said other ring to starting position, including an assembly composed of a photoelectric resistor and a capacitor connected in series with said resistor, a source of electrical energy connected in series with said assembly, a relay connected in parallel with said assembly and having a movable armature arranged to block said other ring in cocked position in response to energization of said relay, normally open first and second switches connected in series with said source and said assembly and in parallel with each other so that said relay is energized and said capacitor is charged when at least one of said switches is closed, means rotatable with said one ring for closing said first switch in cocked position of said one ring, and means including a cam provided on said other ring for temporarily closing said second switch during cocking of said rings so that said capacitor is charged during such cocking and discharges across said photoelectric resistor on opening of said first switch to energize said relay for an interval whose length is determined by the momentary resistance of said photoelectric resistor.

11. In a camera, a combined diaphragm and shutter mechanism comprising a pair of concentric rings rotatable with and relative to each other about the optical axis between starting and cocked positions; return spring means for biasing said rings to starting positions; manually actuated cocking and releasing means for rotating said rings to cocked positions and for releasing said rings; blades movably coupled with said rings and defining a diaphragm opening when one of said rings rotates to starting position ahead of the other ring; retard means for controlling the speed of movement of one of said rings to starting position and an electric circuit for delaying rotation of said other ring to starting position, including an assembly composed of a photoelectric resistor and a capacitor connected in series with said resistor, a source of electrical energy connected in series with said assembly, a relay connected in parallel with said assembly and having a movable armature arranged to block said other ring in cocked position in response to energization of said relay, normally open first and second switches connected in series with said source and said assembly and in parallel with each other so that said relay is energized and said capacitor is charged when at least one of said switches is closed, means rotatable with said one ring for closing said first switch in cocked position of said one ring, and means including a cam connected for movement with said cocking means for temporarily closing said second switch during cocking of said rings so that said capacitor is charged during such cocking and discharges across said photoelectric resistor on opening of said first switch to energize said relay for an interval whose length is determined by the momentary resistance of said photoelectric resistor.

12. In a camera, a combined diaphragm and shutter mechanism comprising a pair of concentric rings rotatable with and relative to each other about the optical axis between starting and cocked positions; return spring means for biasing said rings to starting positions; manually actuated cocking and releasing means for rotating said rings to cocked positions and for releasing said rings; blades movably coupled with said rings and defining a diaphragm opening when one of said rings rotates to starting position ahead of the other ring; a retard mechanism for controlling the speed of said one ring during rotation to starting position; and an electric circuit for delaying rotation of said other ring to starting position, including an assembly composed of a photoelectric resistor and a capacitor connected in series with said resistor, a source of electrical energy connected in series with said assembly, a relay connected in parallel with said assembly and having a movable armature arranged to block said other ring in cocked position in response to energization of said relay, normally open first and second switches connected in series with said source and said assembly and in parallel with each other so that said relay is energized and said capacitor is charged when at least one of said switches is closed, means rotatable with said one ring for closing said first switch in cocked position of said one ring, and means for temporarily closing said second switch during cocking of said rings so that said capacitor is charged during such cocking and discharges across said photoelectric resistor on opening of said first switch to energize said relay for an interval whose length is determined by the momentary resistance of said photoelectric resistor.

13. In still camera, a self-cocking shutter having a pair of setting members movable with and relative to each other between starting and cocked positions and each tending to assume the respective starting position; means for moving said members to cocked positions; blades movably coupled with said members and defining a diaphragm opening when one of said members moves to starting position ahead of the other member; and an electric circuit for delaying movement of said other member to starting position, including a variable resistor, a source of electrical energy connected in series with said resistor, a relay connected in parallel with said resistor and having an armature arranged to block said other member in cocked position in response to a change in the condition of energization of said relay, normally open first and second switches connected in series with said resistor and said source and in parallel with each other so that the condition of energization of said relay is changed when at least one of said switches is closed, means for closing said first switch in cocked position of said one member, and means for temporarily closing said second switch during cocking of said members.

14. In an automatic still camera, self-cocking shutter having a pair of setting members movable with and relative to each other between starting and cocked positions and each tending to assume the respective starting position; cocking means for moving one of said members to cocked position; motion transmitting means provided on said members for cocking the other member in response to cocking of said one member; blades movably coupled with said members and defining a diaphragm opening when said one member moves to starting position ahead of said other member; and an electric circuit for delaying movement of said other member to starting position, including a variable resistor, a source of electrical energy connected in series with said resistor, a relay connected in parallel with said resistor and having an armature arranged to block said other member in cocked position in response to a change in the condition of energization of said relay, normally open first and second switches connected in series with said resistor and said source and in parallel with each other so that the condition of energization of said relay is changed when at least one of said switches is closed, means for closing said first switch in cocked position of said one member, and means for temporarily closing said second switch during cocking of said members.

No references cited.

JOHN M. HORAN, *Primary Examiner.*